United States Patent
Hawes et al.

(10) Patent No.: US 8,324,144 B2
(45) Date of Patent: *Dec. 4, 2012

(54) COLOR CHANGING PAINT REMOVING COMPOSITION CONTAINING METHYLENE CHLORIDE

(75) Inventors: Charles L. Hawes, Cordova, TN (US); Dennis E. Shireman, Marion, AR (US)

(73) Assignee: W.M. Barr & Company, Inc., Memphis, TN (US)

( * ) Notice: Subject to any disclaimer, the term of this patent is extended or adjusted under 35 U.S.C. 154(b) by 63 days.

This patent is subject to a terminal disclaimer.

(21) Appl. No.: 11/122,477

(22) Filed: May 5, 2005

(65) Prior Publication Data

US 2006/0252663 A1    Nov. 9, 2006

(51) Int. Cl.
*C09D 9/00* (2006.01)

(52) U.S. Cl. ........ 510/201; 510/174; 510/211; 106/190; 134/38

(58) Field of Classification Search ................... 510/201, 510/174, 211; 106/190; 134/38
See application file for complete search history.

(56) References Cited

U.S. PATENT DOCUMENTS

| | | | | |
|---|---|---|---|---|
| 2,507,983 A | | 5/1950 | Kuentzel | |
| 2,507,985 A | * | 5/1950 | Kuentzel | ........................ 510/204 |
| 4,120,810 A | | 10/1978 | Palmer | |
| 4,579,627 A | * | 4/1986 | Brailsford | ........................ 134/38 |
| 4,666,626 A | | 5/1987 | Francisco | |
| 4,749,510 A | | 6/1988 | Nelson | |
| 4,812,255 A | | 3/1989 | Suwala | |
| 5,006,279 A | | 4/1991 | Grobbel et al. | |
| 5,011,621 A | | 4/1991 | Sullivan | |
| 5,049,300 A | | 9/1991 | Fusiak et al. | |
| 5,188,666 A | * | 2/1993 | Boccardo | ................... 106/194.3 |
| 5,288,335 A | | 2/1994 | Stevens | |
| 5,298,184 A | | 3/1994 | Jarema | |
| 5,332,526 A | | 7/1994 | Stanley | |
| 5,334,331 A | * | 8/1994 | Fusiak | ........................ 510/174 |
| 5,468,415 A | | 11/1995 | Jarema | |
| 5,472,641 A | * | 12/1995 | Kuder et al. | ................... 510/206 |
| 5,478,491 A | | 12/1995 | Jarema | |
| 5,518,661 A | * | 5/1996 | Langford et al. | ............. 252/364 |
| 5,565,136 A | * | 10/1996 | Walsh | ........................ 510/203 |
| 5,609,678 A | | 3/1997 | Bergman | |
| 5,753,603 A | | 5/1998 | Lallier et al. | |
| 6,001,192 A | | 12/1999 | Lallier et al. | |
| 6,057,276 A | * | 5/2000 | Smith | ........................ 510/174 |
| 6,096,699 A | * | 8/2000 | Bergemann et al. | ........... 510/201 |
| 6,159,257 A | * | 12/2000 | Koutlakis et al. | ............... 51/302 |
| 6,191,087 B1 | * | 2/2001 | Opre et al. | ........................ 510/201 |
| 6,197,951 B1 | * | 3/2001 | Lenz | ........................ 536/123.1 |
| 7,087,566 B2 | * | 8/2006 | Shireman | ........................ 510/212 |
| 2004/0121707 A1 | * | 6/2004 | Drake et al. | ........................ 451/38 |
| 2006/0252663 A1 | * | 11/2006 | Hawes et al. | ........................ 510/201 |

* cited by examiner

*Primary Examiner* — Mark Eashoo
*Assistant Examiner* — M. Reza Asdjodi
(74) *Attorney, Agent, or Firm* — Baker, Donelson, Bearman, Caldwell & Berkowitz, PC

(57) ABSTRACT

A composition and related process for removing paint from a substrate in which the composition contains methylene chloride, an organic filler, a colorant, a thickening agent and an evaporation retardant.

16 Claims, No Drawings

COLOR CHANGING PAINT REMOVING COMPOSITION CONTAINING METHYLENE CHLORIDE

TECHNICAL FIELD

The present invention relates to a color changing paint removing composition. In a more specific aspect, this invention relates to a color changing paint removing composition which contains methylene chloride.

This invention also relates to a process for removing paint from a substrate by using a composition which changes color and which contains methylene chloride.

In this application, the term "paint" will be understood to refer to coatings such as epoxies, enamels, latexes, primers, basecoats, clearcoats, oil based paints, lacquers, varnishes, shellacs and polyurethane finishes which are used to protect and/or beautify substrates. As used in this application, the terms "paint removing", "paint remover" and "paint removal" refer to compositions which remove or facilitate the removal of paint from a substrate.

BACKGROUND OF THE INVENTION

Chemical based paint removers (also referred to as "paint strippers") have enjoyed widespread commercial application due to their relative ease of use when compared to various physical methods of paint removal, such as scraping and sanding. Many of these paint removers are solvent based, utilizing methylene chloride, methanol, acetone, toluene, xylene or other solvent components.

U.S. Pat. No. 2,507,983 discloses a paint stripper which contains methylene chloride and methyl cellulose, which is a thickening agent used to increase the viscosity of the formulation. Methylene chloride is an effective low cost paint stripper solvent characterized by high vapor pressure (400 mm Hg at 75° F.) which causes the methylene chloride to evaporate very rapidly.

U.S. Pat. Nos. 4,120,810; 4,666,626; 4,749,510; 4,812,255; 5,006,279; and 5,049,300 disclose paint stripping compositions which may include aromatic hydrocarbons or aromatic solvents.

U.S. Pat. No. 5,011,621 relates to mixtures of selected solvents (which may include aromatic hydrocarbons and terpenes such as d-limonene), as well as animal and/or vegetable oil, as a means to effectively remove paint from substrates. However, the presence of one or more of these natural components, such as tallows and fatty acids, may lead to the growth of microbiological organisms within the formulation, thereby decreasing the product's shelf life. The presence of microbiological organisms could lead to altered product performance as well as a noxious and rancid odor, especially after the product is exposed to sunlight.

Another concern with paint stripping compositions is how to determine when the composition has rendered at least a substantial portion of the paint removable from the substrate. This determination is important because the paint tends to solidify (i.e., harden) and re-adhere if applied to a substrate for an extended period of time. Of course, after the paint begins to solidify, removal of the paint is more difficult.

Paint stripping compositions which advertise a color change when the stripping action is substantially complete have been developed and are commercially available. However, we have found that these compositions do not function as advertised. We have found that the color change is due to the evaporation of free water from the composition and not due to the substantial completion of the stripping action. In addition, we have found that such compositions which contain a large amount of free water tend to harden on the surface, which makes removal of the composition and paint very difficult.

Thus, the industry is in need of an effective paint removal composition which eliminates or at least minimizes the concerns of shelf life, free water content, hardening of the composition and color change as discussed above.

SUMMARY OF THE INVENTION

The present invention provides a color changing composition for removing paint from a substrate. As compared to the compositions of the prior art as described above, the composition of this invention is more effective in removing paint from a substrate in an equivalent or shorter amount of time. In addition, the compositions of this invention tend to have fast evaporation rates. The paint removing compositions of this invention also exhibit a color change when the paint removing function is substantially complete.

The present invention also provides a process for using this composition for removing paint from a substrate.

Briefly described, the present invention removes paint from a substrate by using a new and advantageous composition which contains methylene chloride, an organic filler, a colorant, a thickening agent and an evaporation retardant. Each component in the composition is used in a defined weight percent range, based on the total weight of the composition.

Accordingly, an object of this invention is to provide a composition for removing paint from a substrate.

Another object of this invention is to provide a composition for removing paint from a substrate wherein the composition is substantially more effective in removing paint in an equivalent or shorter amount of time, as compared to prior color change paint removing compositions which do not contain methylene chloride.

Another object of this invention is to provide a paint removing composition which changes color to indicate that paint is removable from a substrate.

Another object of this invention is to provide a paint removing composition which contains no, or a minimal amount of, free water.

Another object of this invention is to provide a paint removing composition which contains methylene chloride and an organic filler.

Another object of this invention is to provide a paint removing composition which is effective with a broad range of paints.

Still another object of this invention is to provide a process for removing paint from a substrate.

Still another object of this invention is to provide a process for removing paint from a substrate by using a composition which is substantially more effective in removing paint in an equivalent or shorter amount of time, as compared to prior color change paint removing compositions which do not contain methylene chloride.

Still another object of this invention is to provide a process for removing paint from a substrate by using a composition which changes color to indicate that paint is removable from the substrate.

Still another object of this invention is to provide a process for removing paint from a substrate by using a composition which contains no, or a minimal amount of, free water.

Still another object of this invention is to provide a process for removing paint from a substrate by using a composition which contains methylene chloride and an organic filler.

Still another object of this invention is to provide a process for removing a broad range of paints from a substrate.

These and other objects, features and advantages of the present invention will become apparent from the following description.

DETAILED DESCRIPTION OF THE INVENTION

The present invention provides a composition for removing paint from a substrate, wherein the composition comprises methylene chloride, an organic filler, a colorant, a thickening agent and an evaporation retardant. The present invention also provides a process by which the above defined composition is used to remove paint from a substrate.

As used in this application, the term "substrate" will be understood to include wood, metal, masonry and other types of surfaces to which paint can be applied.

As defined above, there are certain essential components in the composition of this invention. These components and their corresponding weight percent ranges are shown below, with the weight percents being based on the total weight of the composition.

| Component | Weight Percent Range |
| --- | --- |
| Methylene Chloride | about 10.0 to about 80.0 (preferably about 20.0 to about 60.0) |
| Organic Filler | about 20.0 to about 60.0 (preferably about 30.0 to about 50.0) |
| Colorant | about 0.01 to about 1.0 (preferably about 0.05 to about 0.5) |
| Evaporation Retardant | about 1.0 to about 7.0 (preferably about 1.5 to about 4.0) |
| Thickening Agent | about 0.1 to about 5.0 (preferably about 0.5 to about 2.0) |

If these components are used in amounts outside these ranges, the paint removal composition may provide less desirable results.

As discussed above, methylene chloride is known as a solvent for use in paint removing compositions. Other solvents can be used in mixture with methylene chloride. Examples of such other solvents are N-methyl-2-pyrrolidone; dibasic esters, such as dimethyl adipate, dimethyl glutarate and dimethyl succinate; carbonates, such as ethylene carbonate, propylene carbonates and butylene carbonate; alcohols, such as ethyl alcohol, benzyl alcohol, furfuryl alcohol and tetrahydrofurfuryl alcohol; d-limonene; dimethyl sulfoxide; methyl esters; methylal; and mixtures thereof.

In this invention, the use of an organic filler and a colorant provides a paint removing composition with the ability to change color to indicate that a substantial amount of paint is removable from the substrate.

Examples of organic fillers which can be used in the compositions of this invention include the starches, cellulosic materials, flour, carbohydrates and mixtures thereof. Suitable starches include potato, rice and corn starch and mixtures thereof. Suitable cellulosic materials include cellulose powder and cellulose fibers. Suitable carbohydrates include monosaccharides, disaccharides and polysaccharides, such as glucose and lactose. Mixtures of two or more organic fillers can be used.

In the compositions of this invention, the organic filler functions as a base for the color change of the composition, but also functions as a filler and provides opacity so that the area of application can be easily seen, helps reduce odor and helps to solidify the stripped paint so clean up and waste disposal are easier.

The colorant useful in this invention can be selected from commercially available pigments and dyes which enable the composition to change color when at least a substantial portion of the paint is in a condition to be removed from the substrate.

The evaporation retardant which can be used in the compositions of this invention are those commercially available materials which are known to slow the evaporation rate of methylene chloride. Examples of useful evaporation retardants include film forming resins; acrylic resins; hydrocarbon resins (such as polyethylene); and the waxes, such as paraffin wax and ester waxes. A preferred evaporation retardant is paraffin wax. Mixtures of these materials can be used.

Optional components may be added to the composition of this invention to achieve other objectives. Examples of these optional components are other colorants, stabilizers, evaporation retardants, bittering agents, other solvents, free water, viscosity enhancers, pH adjusting agents, etc. These optional components can be used in the amounts necessary to achieve the desired objectives.

The thickening agent useful in this invention can be an inorganic or organic material. Examples of suitable inorganic thickening agents are silica, metallic silicates and clays. Examples of suitable organic thickening agents are polymeric materials (such as cellulosic materials, including cellulose fibers and cellulose powder) and gums. Mixtures of thickening agents can also be used. Preferred thickening agents are methyl cellulose and hydroxypropyl methyl cellulose.

If used in the compositions of this invention, the amount of free water is minimal to avoid interference with the color change. The term "minimal amount" refers to less than about 2.0 percent by weight of free water, preferably less than about 1.5 percent by weight, based on the total weight of the composition. Water of hydration or water which is contained within the structure of various components of this composition is not included in the term "free water".

The present invention is further illustrated by the following Examples which are designed to teach those of ordinary skill in the art how to practice this invention and to represent the best mode contemplated for carrying out this invention.

EXAMPLE 1

Based on our analysis, a commercially available paint removing composition contained the following components, with the approximate weight percent being based on the total weight of the composition.

| Component | Approximate Weight Percent |
| --- | --- |
| N-methyl-2-pyrrolidone | 10 |
| Dibasic Ester | 18 |
| Carbohydrate (starch) | 45 |
| Free Water | 25 |
| Metallic Silicate Thickener | 2 |
| Green Dye | trace |

In regard to this commercially available paint removing composition, the manufacturer advertises that the composition changes color when the paint was ready to strip. However, our testing of this product showed very slow performance on latex paint and very little performance on oil based paint. However, the color appeared to change with the evaporation of the large amount of water in the composition. Thus, the color change was not always indicative of the composition having stripped the paint, especially with the oil based paints which are more difficult to strip.

EXAMPLE 2

A paint removing composition of this invention is prepared using conventional techniques and process steps.

| Component | Weight Percent |
|---|---|
| Methylene Chloride | 50.58 |
| Common Starch | 34.91 |
| Phenolic Surfactant | 1.50 |
| Hydroxypropyl Methyl Cellulose | 0.55 |
| Dye | 0.05 |
| Paraffin Wax | 1.80 |
| Ammonium Hydroxide (58%) | 0.02 |
| Free Water | 1.065 |
| Diammonium Phosphate | 0.002 |
| Methanol | 4.00 |
| Isopropyl Alcohol | 4.72 |
| Triethylamine Phosphate | 0.80 |
| | 100.000 |

This composition was tested for paint removal properties with oil based and latex paints.

By comparison to the commercially available composition described above in Example 1, the performance of the composition of this invention was much faster on both latex and oil based paints.

This invention has been described in detail with particular reference to certain embodiments, but variations and modifications can be made without departing from the spirit and scope of the invention as defined in the following claims.

What is claimed is:

1. A color changing composition for removing paint from a substrate, wherein the composition consists essentially of the following components:
   A. from about 20.0 to about 60.0 percent by weight of methylene chloride;
   B. from about 0.01 to about 1.0 percent by weight of a colorant;
   C. from about 30.0 to about 50.0 percent by weight of starch;
   D. from about 1.0 to about 7.0 percent by weight of an evaporation retardant; and
   E. from about 0.1 to about 5.0 percent by weight of a thickening agent;
       wherein the composition contains from zero to less than about 2.0 percent by weight free water and wherein the composition exhibits a color change to indicate that paint is removable from the substrate.

2. A composition as defined by claim 1 wherein the composition further comprises N-methyl-2-pyrrolidone.

3. A composition as defined by claim 1 wherein the composition further comprises a solvent selected from ethylene carbonate, propylene carbonate, ethyl alcohol, benzyl alcohol, furfuryl alcohol, tetrahydrofurfuryl alcohol, d-limonene, dimethyl sulfoxide, methyal or mixture thereof.

4. A composition as defined by claim 1 wherein the starch is potato starch, rice starch, corn starch or mixture thereof.

5. A composition as defined by claim 1 wherein the composition comprises from about 0.5 to about 2.0 percent by weight of an inorganic or organic thickening agent.

6. A composition as defined by claim 5 wherein the thickening agent is a silica, metallic silicate, clay, gum, polymer or mixture thereof.

7. A composition as defined by claim 5 wherein the thickening agent is hydroxypropyl methyl cellulose, hydroxypropyl cellulose or mixture thereof.

8. A composition as defined by claim 1 wherein the colorant is a pigment, dye or mixture thereof.

9. A process for removing paint from a substrate, wherein the process comprises treating the substrate with a composition which consists essentially of the following components:
   A. from about 20.0 to about 60.0 percent by weight of methylene chloride;
   B. from about 0.01 to about 1.0 percent by weight of a colorant;
   C. from about 30.0 to about 50.0 percent by weight of starch;
   D. from about 1.0 to about 7.0 percent by weight of an evaporation retardant; and
   E. from about 0.1 to about 5.0 percent by weight of a thickening agent;
       wherein the composition contains from zero to less than about 2.0 percent by weight free water and wherein the composition exhibits a color change to indicate that paint is removable from the substrate.

10. A process as defined by claim 9 wherein the composition further comprises N-methyl-2-pyrrolidone.

11. A process as defined by claim 9 wherein the composition further comprises a solvent selected from ethylene carbonate, propylene carbonate, ethyl alcohol, benzyl alcohol, furfuryl alcohol, tetrahydrofurfuryl alcohol, d-limonene, dimethyl sulfoxide, methyal or mixture thereof.

12. A process as defined by claim 9 wherein the starch is potato starch, rice starch, corn starch or mixture thereof.

13. A process as defined by claim 9 wherein the composition comprises from about 0.5 to about 2.0 percent by weight of an inorganic or organic thickening agent.

14. A process as defined by claim 13 wherein the thickening agent is a silica, metallic silicate, clay, gum, polymer or mixture thereof.

15. A process as defined by claim 13 wherein the thickening agent is hydroxypropyl methyl cellulose, hydroxypropyl cellulose or mixture thereof.

16. A process as defined by claim 9 wherein the colorant is a pigment, dye or mixture thereof.

* * * * *